United States Patent [19]

Bowen et al.

[11] Patent Number: 5,011,255
[45] Date of Patent: Apr. 30, 1991

[54] HOLOGRAPHIC OPTICAL FIBER COUPLER

[75] Inventors: Terry P. Bowen, Etters, Pa.; John R. Rowlette, Clemmons, N.C.

[73] Assignee: AMP Incorporated, Harrisburg, Pa.

[21] Appl. No.: 508,884

[22] Filed: Apr. 12, 1990

[51] Int. Cl.$^5$ .......................... G02B 6/34; G02B 5/32
[52] U.S. Cl. ................................ 350/96.19; 350/96.20; 350/3.7
[58] Field of Search .............. 350/96.15, 96.16, 96.18, 350/96.19, 96.20, 96.21, 96.22, 3.7, 3.72, 3.73, 3.83

[56] References Cited

U.S. PATENT DOCUMENTS

| 3,666,345 | 5/1972 | Maslowski | 350/96.19 X |
| 3,883,223 | 5/1975 | Hudson | 350/96.15 X |
| 3,975,082 | 8/1976 | Winzer | 350/96.19 X |
| 4,057,319 | 11/1977 | Ash et al. | 350/96.19 |
| 4,337,993 | 7/1982 | Kompfner | 350/96.19 |
| 4,398,792 | 8/1983 | Horner et al. | 350/96.19 X |
| 4,455,088 | 6/1984 | Koike | 356/334 |
| 4,465,332 | 8/1984 | Horner et al. | 350/96.19 |
| 4,500,163 | 2/1985 | Burns et al. | 350/3.7 |
| 4,684,208 | 8/1987 | Ishikawa et al. | 350/96.15 X |
| 4,714,309 | 12/1987 | Woodcock et al. | 350/3.7 |
| 4,722,582 | 2/1988 | Modone et al. | 350/96.15 X |
| 4,907,851 | 3/1990 | Marhic | 350/96.19 |
| 4,926,412 | 5/1990 | Jannson et al. | 370/3 X |
| 4,946,253 | 8/1990 | Kostuck | 350/96.19 |

OTHER PUBLICATIONS

"Miniature Optics for Optical Recording", Glenn T. Sincerbox, SPIE vol. 935, Gradient-Index Optics and Miniature Optics (1988), pp. 63-76.
"Hybrid Diffractive-Refractive Lenses and Achromats", T. Stone and N. George, Applied Optics, vol. 27, No. 14, Jul. 15, 1988, pp. 2960-2971.
"Holographic Optical Head for Compact Disk Applications", W. Lee, Optical Engineering, vol. 28, No. 6, Jun. 1989, pp. 650-653.
"Diffractice Optical Elements for Use in Infrared Systems", G. Swanson and W. Veldkamp, Optical Enginnering, vol. 28, No. 6, Jun. 1989, pp. 605-608.

Primary Examiner—Brian Healy

[57] ABSTRACT

An optical fiber coupler for coupling optical fibers to one another comprises a holographic optical element (HOE), having an optical axis enclosed in a housing. The housing includes fiber guides adapted to receive at least one pair of optical fibers and to dispose at least an end of each of the pair of fibers substantially parallel to each other, substantially perpendicular to one face of the HOE, equidistant from th eoptical axis of the HOE, and equidistant from the surface of the HOE. The optical fiber coupler is compact, commercially versatile, inexpensive to manufacture and easy to connect.

52 Claims, 2 Drawing Sheets

HOLOGRAPHIC OPTICAL FIBER COUPLER

FIELD OF THE INVENTION

The present invention relates to optical communications. More particularly, it relates to couplers for optically coupling optical fibers to one another.

BACKGROUND OF THE INVENTION

Various methods and arrangements for coupling light waves propagating from one optical fiber to another optical fiber are known. For example, U.S. Pat. No. 3,666,345 to Maslowski discloses end-to-end coupling of optical fibers using a hologram as an optical transmitting device. These types of end-to-end arrangements, however, take up a relatively large amount of space and may be impractical for applications that require a compact optical fiber coupler. In addition, proper alignment of the fibers in end-to-end devices is critical and is difficult to obtain. If the end-to-end fibers are aligned improperly, the coupler produces unacceptable insertion loss.

Optical fiber couplers for a plurality of parallel optical fibers are disclosed in U.S. Pat. No. 3,883,223 to Hudson and U.S. Pat. No. 4,722,582 to Modone et.al. The couplers disclosed in these patents couple a bundled, parallel arrangement of a plurality of optical fibers positioned relative to a concave reflective surface such as a spherical mirror whereby the optical signal from one fiber is transmitted to at least one of the remaining fibers in the bundle. This arrangement lessens the alignment problem encountered with end-to-end fiber couplings. However, spherical mirror couplers are not sufficiently compact for many commercial applications. In a spherical mirror coupler, the greater the number of parallel fibers employed, the farther away the spherical mirror must be placed in order to maintain the necessary acceptance angle for the optical fibers to minimize attenuation of the optical signal. Thus, the number of fibers that can be utilized in a compact structure is limited.

SUMMARY OF THE INVENTION

It is therefore an object of the present invention to provide an optical fiber coupler that is inexpensive to manufacture, compact, easy to connect and commercially versatile.

It is another object of the present invention to provide an optical fiber coupler wherein the optical output transmitted from one fiber to another is performed with minimal insertion loss.

It is yet another object of the present invention to provide an optical fiber coupler for optically coupling a plurality of pairs of substantially parallel optical fibers.

These and other objects which will become apparent to persons of ordinary skill of the art are accomplished by providing an optical fiber coupler for coupling optical fibers to one another, comprising a housing and a holographic optical element (HOE) enclosed within the housing. The housing includes a pair of guides which are adapted to receive at least one pair of optical fibers and to dispose the fibers such that at least the ends of the fibers are on the same side of and substantially perpendicular to the HOE, equidistant from the optical axis of the HOE. The ends of the fibers may be in contact with the HOE, or at a predetermined distance therefrom as defined by an optical spacer element between the fiber guides and the HOE. The HOE couples optical energy between the fibers.

The HOE of the present invention may be a wavelength compensated HOE, to allow for efficient coupling of optical signals from fiber to fiber, notwithstanding minor variations in the wavelength of the signals. In one embodiment the HOE is a reflective HOE, for transmitting optical signals from fiber to fiber using reflection by the HOE. In another embodiment, a transmissive HOE used in combination with a mirror on the face of the HOE opposite the fiber guides. Optical energy from one fiber is transmitted through the HOE, and reflected back through the HOE a second time by the mirror, to couple the energy to the other fiber.

In another embodiment of the invention, a transmissive HOE is coupled to a plano-convex spherical component, having a planar surface and a spherical surface. The planar surface is mounted on the face of the HOE opposite the fiber guides, and a mirror or other reflective coating is placed on the spherical surface. Accordingly, light from one fiber is transmitted through the HOE and back again a second time after being reflected from the mirror, and onto the other fiber.

In yet another embodiment of the invention a curved HOE may be used to couple optical energy between fibers via its concave surface. The HOE may be a reflective HOE, or the HOE may be transmissive, with the convex surface mirrored to provide reflection behind the HOE.

The fiber guides of the present invention may be cylindrical, triangular or other shaped guides. They may be oriented to converge the fibers as they approach the HOE, diverge the fibers as they approach the HOE or maintain the fibers parallel to one another. A pair of guides may be provided in a single bore, with the guides being adapted to maintain the ends of the fibers equidistant from the optical axis of the HOE. For example, a guide of elliptical cross section may be provided to accommodate a pair of fibers and keep the fibers aligned therein Multiple guide pairs may be provided for coupling multiple pairs of fibers, with each pair of guides maintaining the respective ends of the fibers inserted therein equidistant from the HOE optical axis.

The present invention provides optical fiber couplers that can accommodate large numbers of optical fibers in a compact device that is inexpensive and easy to connect. In fact, the present invention may be considered a fiber optic equivalent to the conventional "wire nut" used in electrical wiring applications. The compactness obtained by the device can be attributed to the unique optical coupling capabilities of the HOE.

DETAILED DESCRIPTION OF THE PREFERRED EMBODIMENTS

The present invention will now be described more fully hereinafter with reference to the accompanying drawings, in which a preferred embodiment of the invention is shown. This invention may, however, be embodied in many different forms and should not be construed as limited to the embodiment set forth herein; rather, applicants provide this embodiment so that this disclosure will be thorough and complete, and will fully convey the scope of the invention to those skilled in the art.

Figure 1:
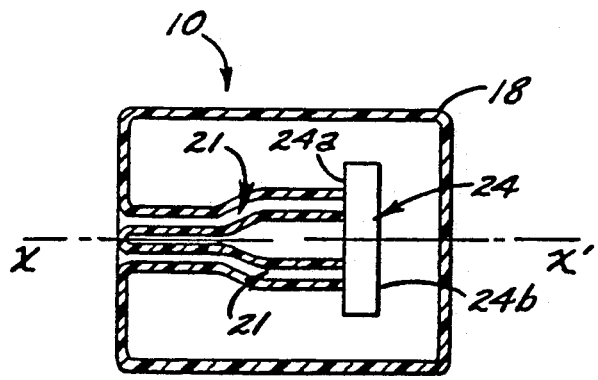
FIGS. 1, 2, 4 and 6 are cross-sectional views of a first embodiment of a optical fiber coupler according to the present invention.

Referring now to FIG. 1, optical fiber coupler 10 comprises substantially flat, reflective HOE 24 enclosed within housing 18. The housing is adapted, by means of open-ended fiber optic guides or channels 21, for example of circular cross section, to receive at least one pair of optical fibers and to dispose at least an end of each of the fibers substantially parallel to each other, on the same side and substantially perpendicular to the HOE, and equidistant from the HOE and from optical axis XX'. In this embodiment, the channels and the HOE are disposed relative to each other such that when the fibers are disposed in the housing, an end of each of the fibers physically contacts the first face 24a of the HOE.

HOE's or holograms as they are commonly referred to, can be made for a variety of optical applications. A single HOE is more compact than a typical refractive lens because it can perform the function of more than one reflective or refractive element HOE's can be prepared by using coherent optical techniques well known to those skilled in the art. See, for example, chapters 13-14 in Kasper et. al., *The Complete Book of Holograms; How They Work and How to Make Them*, Wiley & Sons, New York (1987). HOE's can be designed by computer, and prepared by E-beam lithography. See, for example, Swansen et.al., *Optical Engineering*, "Diffractive Optical Elements For Use in Infrared Systems," 28(6):605-08 (1989).

The housing 18 may be fabricated of fiber reinforced thermo-plastic or other suitable material The housing can be manufactured to have the guides 21 integral therewith In the alternative, the guides can be provided as separate elements, as described hereinbelow. In the embodiment illustrated in FIGS. 1, 2, 3, 4 and 6, the guides of the housing are constructed such that when the optical fibers are disposed therein, the inserted ends of the fibers are substantially parallel to each other, perpendicular to the first side of the HOE, and are equidistant from optical axis XX' so that the optical output coupled from one fiber to another is maximized. Each guide can be constructed so as to accommodate a single fiber. Alternatively, as described in connection with FIG. 8, a single bore can be provided which accommodates both fiber guides, to maintain the fibers in the orientation described above and without twisting the fibers around one another.

Figure 2:
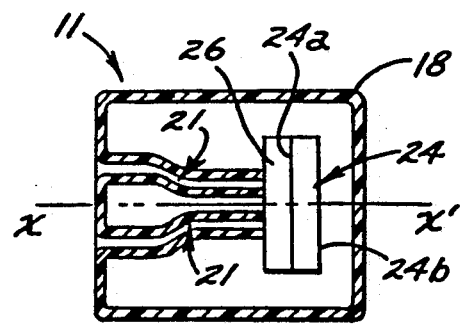

As illustrated in FIG. 2, the first embodiment according to the present invention can be modified by affixing or bonding a substantially flat optical spacer element 26 to the first face 24a of the reflective HOE 24. The open ends of guides 21 are aligned such that when the optical fibers are inserted into the guides, the inserted end of each of the fibers physically contacts the optical spacer element. The optical spacer element protects the HOE, and is usually made of glass, although other transparent materials are also suitable. An index matching, optically transparent adhesive may be used to bond the optical spacer element to the HOE.

The thickness of the optical spacer element is equal to the predetermined distance that the ends of the fibers are to be disposed from the first face of the HOE. In the present invention, the predetermined distance is a function of the manner in which the HOE is prepared For example, a reflective HOE for use in the present invention can be prepared by directing two beams of coherent light onto a photosensitive material layer forming an interferogram. A first collimated beam of coherent light passes through the photosensitive material layer which is disposed at a predetermined distance from a spherical mirror The spherical mirror reflects a second beam of light back through the photosensitive material layer to a focal point, to produce the HOE in the photosensitive material layer by the interference of the incoming parallel beam and the returning focused beam. The optical fiber ends are disposed by the optical spacer from the reflective side of the HOE at a distance equal to twice the focal length of the spherical mirror in order, to provide for one-to-one imaging. The optically transmissive construction of the HOE will result in optically reflective coupling of the light between the optical fibers by the HOE when the HOE is used in the optical fiber coupler.

Figure 3:
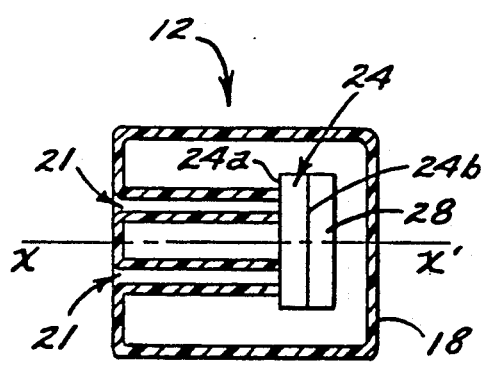
FIG. 3 is a cross-sectional view of a second embodiment of an optical fiber coupler according to the present invention.

FIG. 3 illustrates a transmissive optical fiber coupler wherein HOE 24 is wavelength-compensated. By the term "wavelength-compensated", it is meant that the HOE's of the present invention eliminate additional coupling loss due to the wavelength shifts of the optical source. Otherwise, coupling loss would occur because as with any diffractive element, a HOE is highly sensitive to changes in wavelength. A HOE designed for use at one wavelength will produce a displaced and aberrated spot when illuminated at some other wavelength. Methods for compensating for wavelength shifts are known in the art as described, for example, in Sincerbox, SPIE, "Miniature Optics for Optical Recording," 935:64–76, 72–73 (1988). In the present invention, the preferred technique to compensate for wavelength shifts and eliminate coupling loss is shown in the FIG. 3. Mirror 28 is bonded or fixed to second face 24b of the HOE opposite the face 24a to which the ends of the optical fibers are disposed. The mirror reflects the image back through the HOE for a second pass. The second pass compensates for any imaging errors caused in the first pass induced by wavelength shifts of the optical source.

Figure 4:
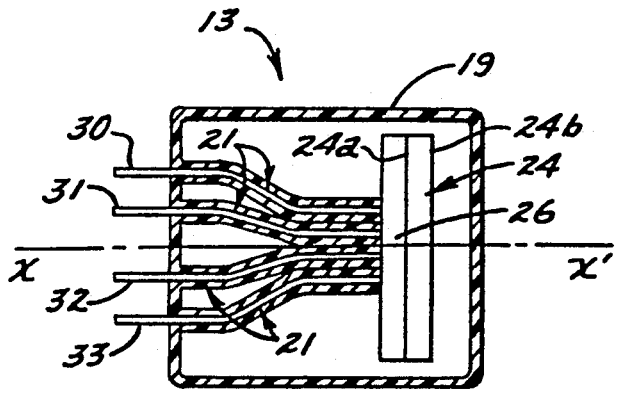

Turning now to FIG. 4, optical fiber coupler 13 comprises HOE 24 enclosed in housing 19, formed to have integral therewith two pairs of open-ended guides Optical fibers 30, 31, 32 and 33 are each shown disposed in one of the channels such that an end of each of the fibers physically contacts the optical spacer 26 which in turn contacts the first face 24a of the HOE. The channels are aligned such that at least the inserted ends of all the fibers are substantially parallel to each other, substantially perpendicular to the reflective side of the HOE, and further such that fiber 30 and fiber 33, and fibers 31 and 32, are equidistant from optical axis XX'.

As shown in the FIG. 4, the channels within housing 19. Can be constructed such that the inserted ends of the optical fibers are convergent, i.e. the 30 fiber is not equidistant from optical axis XX' at every point of the fiber disposed within the housing, and the distance from the optical axis decreases in the direction of the HOE. Of course, the channels may be constructed so as to have the inserted ends of the fibers diverge from each other as they approach the reflective side of the HOE as illustrated in FIG. 1, for example. They may also be parallel to one another as shown in FIG. 3. However, the convergent configuration of FIGS. 2 and 4 is preferred for purposes of the present invention because it allows greater spacing between the open ends of the guides to allow easy insertion of the fibers therein As also shown in FIGS. 1-4, the open ends of the guides may be enlarged slightly, to simplify fiber insertion.

The choice of the particular optical fibers is known to those having skill in the art and depends upon the commercial application of the optical fiber coupler. For example, optical fibers for single-mode applications generally have an optical core region of diameter from 8 to 10 microns to propagate light having a wavelength of about 1.3 microns. Optical fibers for multi-mode applications on the other hand, generally have much larger optical core regions of diameters, e.g. from 50-100 microns, in order to propagate the same 1.3 micron wavelength of light. Normally, an optically insulating cladding region is provided surrounding the optical core region of the fibers, thereby providing a total cross-sectional diameter of about 125 microns. This is a standard diameter for many U.S. and Japanese optical fibers. Therefore, the optical fiber couplers can be prepared in mass quantity inexpensively because the housing and channels can accommodate many different optical fibers having the same cross-sectional diameter.

Figure 5:
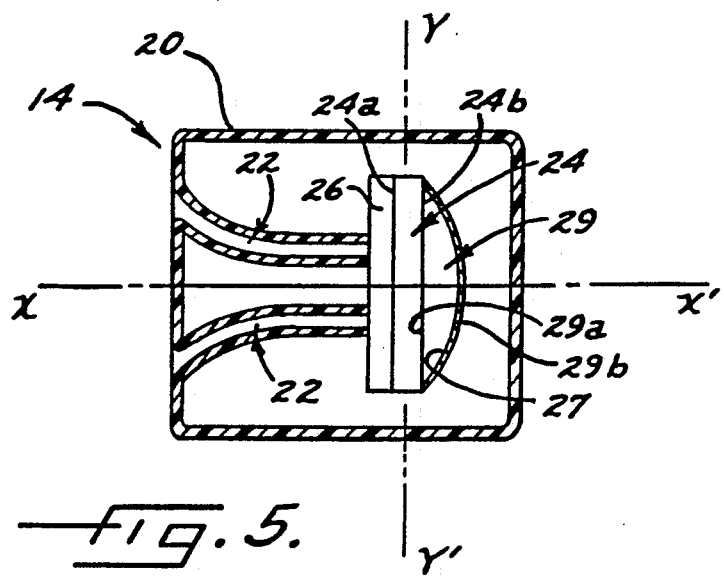
FIG. 5 is a cross-sectional view of a third embodiment of an optical fiber coupler according to the present invention.

A third embodiment according to the present invention is illustrated in FIG. 5. Optical fiber coupler 14 comprises a housing 20, having therein a glass plano-convex spherical component 29 bonded to the HOE 24. The plano-convex spherical component 29 includes a planar surface 29a, bonded to the second face 24b of the HOE 24, and a convex surface 29b. A mirror 27 is placed on the convex surface 29b of plano-convex compound 29. The combination of the HOE and the spherical mirror created is referred to in the art as a "hybrid optical element". Methods for preparing same are known. See, for example, the Sincerbox article discussed above and Stone et.al., Applied Optics, "Hybrid Diffractive-Refractive Lenses and Achromats," Vol. 27 (14):2960-2971 (1988). Hybrid optical elements exhibit enhanced optical quality and allow for relaxed optical fiber alignment in relation to the HOE. Mirror 27 reflects light diffracted by HOE 24 for a second pass through HOE 24 which transmissively couples via optical spacer element 26 to the other optical fiber of the pair.

Figure 6:
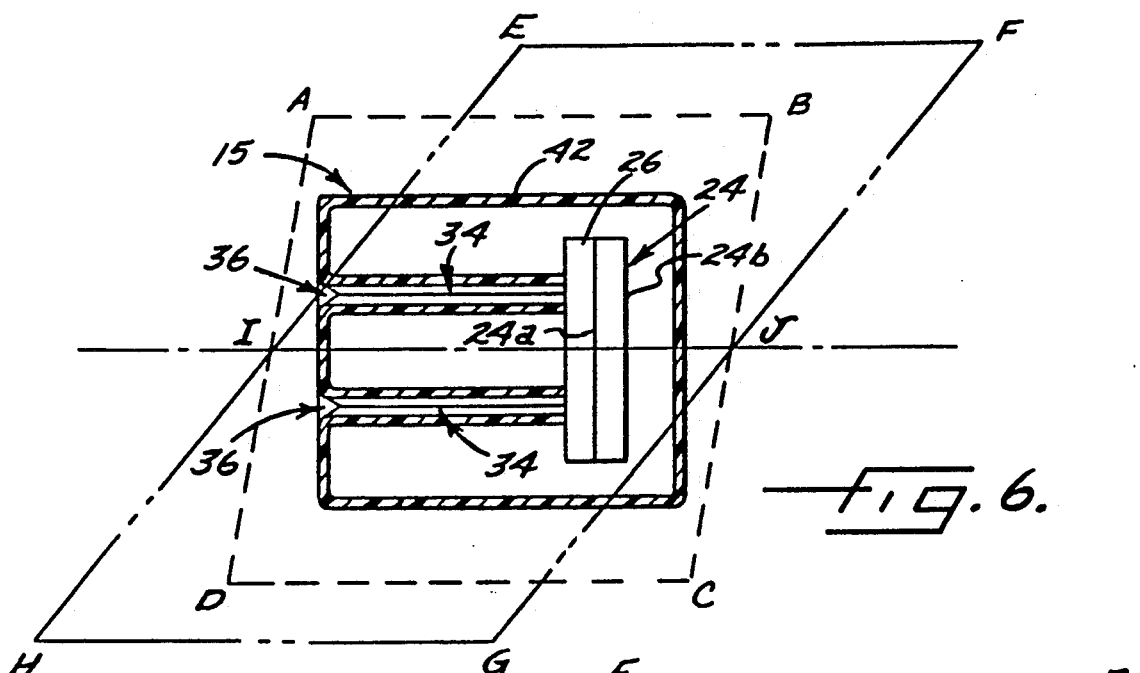

Turning now to FIG. 6, optical fiber coupler 15 comprises HOE 24 enclosed within housing 42. The housing has attached thereto at least one pair of open-ended, hollow fiber guides 34. The guides are each adapted to receive an optical fiber and to position the fiber parallel to the other fiber of a pair perpendicular to the HOE 24, with both fibers lying in a first plane ABCD which perpendicularly bisects HOE 24. The connectors are also adapted to dispose the fibers equidistant from line IJ defined by the intersection of plane ABCD and a second plane EFGH perpendicularly bisecting the HOE and perpendicular to the plane ABCD. Stated simply, FIG. 6 differs from FIGS. 1-2 and 4-5 in that the fibers are equidistant from the optical axis of the HOE (in this embodiment, line IJ) at each point along the entire length of the fibers disposed within the housing. Guides 34 are adapted such that one open end of each is aligned relative to the HOE such that when the optical fibers are disposed in the connectors, an end of each of the fibers physically contacts the first face 24a of the HOE. The other open end of the connectors is suitably adapted to facilitate the insertion of an optical fiber therein.

FIG. 6 illustrates an adapter 36 such as a "v-groove" of triangular cross section fitted end of the guides 34 for this purpose. Other adapters are known in the art. The open end of the guides 34 can be substantially flush with the outside surface of the housing or can extend outwardly therefrom, depending upon the commercial application of the optical fiber coupler.

Figure 7:
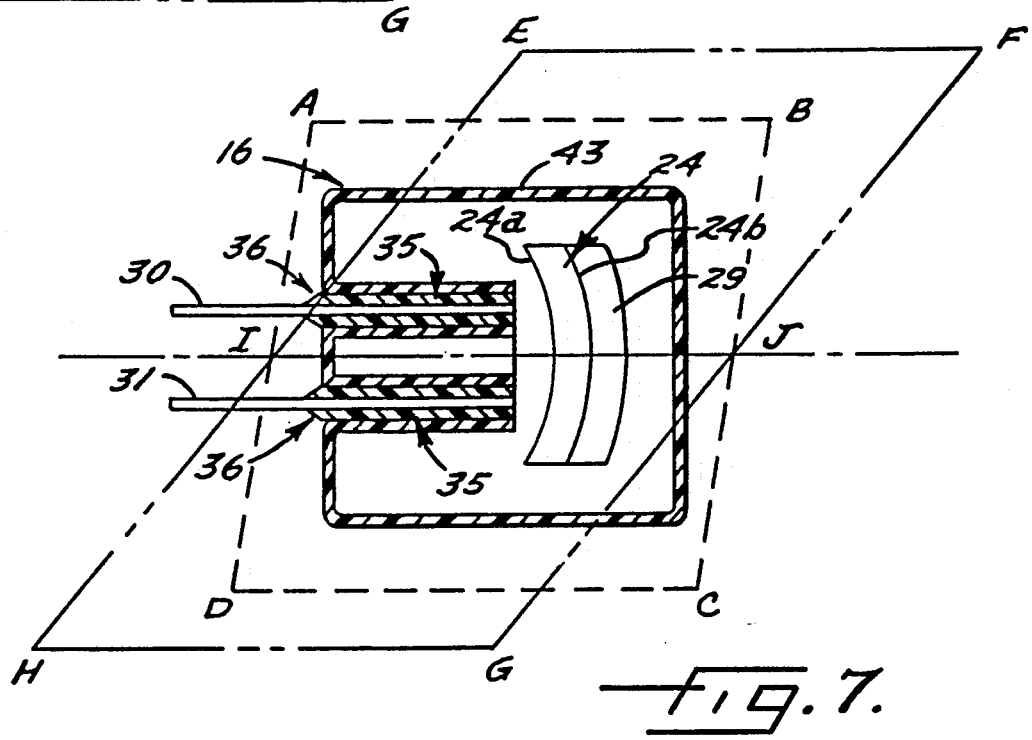
FIG. 7 is a cross-sectional view of a fourth embodiment of an optical fiber coupler according to the present invention.

A variation of the coupler of FIG. 6 is illustrated in FIG. 7. Optical fiber coupler 16 comprises flexible, curved reflective HOE 24, the second face 24b of which is affixed to backing sheet 29, and enclosed in housing 43. A pair of connectors 35 are attached to and disposed within the housing. They are aligned with respect to each other as described hereinabove, except that they are positioned relative to the concave surface 24a of the HOE such that an end of each of optical fibers 30 and 31 is disposed at a predetermined distance from the HOE 24. This distance is calculated in the same manner as described for the embodiment illustrated in FIG. 5.

Figure 8:
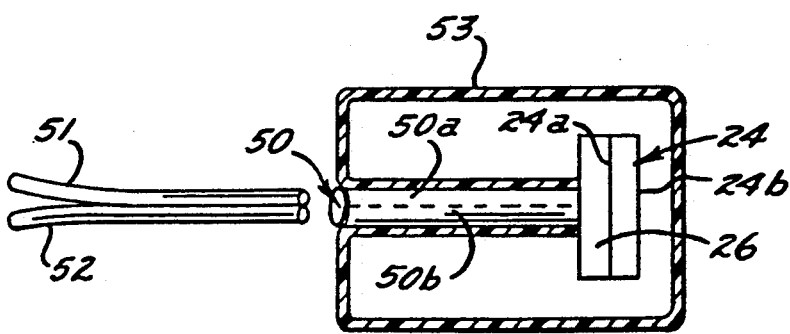
FIG. 8 is a cross-sectional view of a fifth embodiment of an optical fiber coupler according to the present invention.

Referring now to FIG. 8, a fifth embodiment of the coupler of the present invention is shown. As shown, the pair of guide means may be implemented in a single bore 50 within housing 53. The bore 50 is elongated in cross section, having a height equal to the diameter of two fibers 51 and 52 and a width equal to the diameter of one fiber. For example the bore may be 250 microns in height and 125 microns in width. Accordingly, the fibers 51 and 52 may be disposed therein without twisting, with the top half 50a of the bore acting as the first fiber guide and the bottom half 50b acting as the second fiber guide.

The present invention illustrated in FIGS. 1-3 and 5-7 may be modified so as to have a plurality of pairs of connectors to accommodate an equal number of pairs of optical fibers, as shown in FIG. 4, provided that the requisite alignment of each fiber of a pair is maintained.

The present invention provides compact, commercially versatile and inexpensive optical fiber couplers. As described herein, a plurality of optical fibers, wherein at least the ends of which are substantially parallel to each other, can be disposed relative to an HOE wherein optical coupling occurs with minimal power loss or degradation. The problems encountered with concave lenses and other conventional reflective devices such as acceptance angle limitations are eliminated because of the unique reflective capabilities of the HOE. In addition, the disclosed optical fiber couplers do not subject the optical fibers to potentially disruptive forces, such as undue bending, nor do they require end-to-end coupling which presents alignment difficulties. In effect, the present invention functions as an optical fiber "wire nut" splice or coupler.

It is understood that the above-described embodiments are merely illustrative of the application of the principles of this invention. Numerous other embodiments may become apparent or be devised by those skilled in the art without departing from the spirit and scope of the invention, as defined by the claims hereinbelow.

That which is claimed is:

1. An optical fiber coupler for coupling first and second optical fibers, comprising:
   a housing; and a holographic optical element (HOE) in said housing, said HOE having first and second faces and an optical axis;

said housing having first and second guide means therein, said first and second guide means being adapted to guide the ends of the first and second fibers, respectively, to contact said first face of said HOE, perpendicular thereto, and equidistant from said optical axis;

said HOE being adapted to couple optical energy from said first guide means to said second guide means and from said second guide means to said first guide means.

2. The optical fiber coupler of claim 1 further comprising an optical spacer in said housing, adjacent to said first face of said HOE.

3. The optical fiber coupler of claim 1 wherein said HOE is a wavelength-compensated HOE.

4. The optical fiber coupler according to claim 1, wherein said HOE is a transmissive HOE, said coupler further comprising a mirror in said housing, adjacent to said second face of said HOE, for reflecting optical energy emerging from said second face back into said HOE.

5. The topical fiber coupler of claim 1 wherein said HOE is a reflective HOE.

6. An optical fiber coupler for coupling first and second optical fibers, comprising:

a housing; and a holographic optical element (HOE) in said housing, said HOE having first and second faces and an optical axis;

said housing having first and second guide means therein, said first and second guide means being adapted to guide the ends of the first and second fibers, respectively, to said first face, perpendicular thereto, and equidistant from said optical axis; wherein said HOE is a transmissive HOE adapted to couple optical energy from said first guide means to said second guide means and from said second guide means to said first guide means;

said coupler further comprising a plano-convex spherical component having a planar surface and a convex surface, said planar surface affixed to said second surface of said HOE; and a mirror affixed to said convex surface, for reflecting optical energy back into HOE.

7. The optical fiber coupler of claim 1 wherein said first and second guide means coverage towards said HOE.

8. The optical fiber coupler of claim 1 wherein said first and second guide means diverge towards said HOE.

9. The optical fiber coupler of claim 1 wherein said housing includes a bore, extending to said first face, and wherein said first and second guide means are disposed in said bore.

10. The optical fiber coupler of claim 1 wherein said first face is concave.

11. An optical fiber coupler for coupling first and second optical fibers, comprising:

a housing;

a transmissive holographic optical element (HOE) in said housing, said HOE having first and second faces and an optical axis;

an optical spacer in said housing, adjacent to said first face of said HOE;

said housing having first and second guide means therein, said first and second guide means being adapted to guide the ends of the first and second fibers, respectively, to said spacer, perpendicular thereto, and equidistant from said optical axis; and a mirror in said housing, adjacent to said second face of said HOE, for reflecting optical energy emerging from said second face back into said HOE;

said HOE being adapted to couple optical energy from said first guide means to said second guide means and from said second guide means to said first guide means, via transmissive coupling to and from said mirror.

12. The optical fiber coupler of claim 11 wherein said HOE is flat.

13. The optical fiber coupler of claim 11 wherein said HOE is a wavelength-compensated HOE.

14. The optical fiber coupler of claim 11 wherein said first and second guide means are parallel to one another.

15. The optical fiber coupler of claim 11 wherein said first and second guide means converge towards said HOE.

16. The optical fiber coupler of claim 11 wherein said first and second guide means diverge towards said HOE.

17. The optical fiber coupler of claim 11 wherein said housing includes a bore, extending to said optical spacer, and wherein said first and second guide means are disposed in said bore.

18. The optical fiber coupler of claim 11 wherein said optical fiber coupler further couples third and fourth optical fibers; said housing further comprising third and fourth guide means therein, said third and fourth guide mean being adapted to guide the ends of the third and fourth fibers respectively, to said optical spacer, perpendicular thereto and equidistant from said optical axis; said HOE being adapted to couple optical energy from said third guide means to said fourth guide means and from said fourth guide means to said third guide means, via transmissive coupling to and from said mirror.

19. The optical fiber coupler of claim 11 in combination with first and second fibers, disposed in said first and second guide means, respectively.

20. The optical fiber coupler of claim 18 in combination with first, second, third, and fourth fibers disposed in said first, second, third and fourth guide means, respectively.

21. An optical fiber coupler for coupling first and second optical fibers, comprising:

a housing;

a transmissive holographic optical element (HOE) in said housing, said HOE having first and second faces and an optical axis;

an optical spacer in said housing, adjacent to said first face of said HOE;

said housing having first and second guide means therein, said first and second guide means being adapted to guide the ends of the first and second fibers, respectively, to said spacer, perpendicular thereto, and equidistant from said optical axis;

a plano-convex spherical component having a planar surface and a convex surface, in said housing, said planar surface affixed to said second surface of said HOE; and, a mirror in said housing, affixed to said convex surface, for reflecting optical energy from said second HOE back into said HOE;

said HOE being adapted to couple optical energy from said first guide means to said second guide means and from said second guide means to said first guide means, via transmissive coupling to and from said mirror.

22. The optical fiber coupler of claim 21 wherein said HOE is flat.

23. The optical fiber coupler of claim 21, wherein said HOE is a wavelength-compensated HOE.

24. The optical fiber coupler of claim 21 wherein said first and second guide means are parallel to one another.

25. The optical fiber coupler of claim 21 wherein said first and second guide means converge towards said HOE.

26. The optical fiber coupler of claim 21 wherein said first and second guide means diverge towards said HOE.

27. The optical fiber coupler of claim 21 wherein said housing includes a bore, extending to said first face, and wherein said first and second guide means are disposed in said bore.

28. The optical fiber coupler of claim 21 wherein said optical fiber coupler further couples third and fourth optical fibers; said housing further comprising third and fourth guide means therein, said third and fourth guide means being adapted to guide the ends of the third and fourth fibers respectively, to said optical spacer, perpendicular thereto and equidistant from said optical axis; said HOE being adapted to couple optical energy from said third guide means to said fourth guide means and from said fourth guide means to said third guide means, via transmissive coupling to and from said mirror.

29. The optical fiber coupler of claim 21 in combination with first and second fibers, disposed in said first and second guide means, respectively.

30. An optical fiber coupler for coupling first and second optical fibers, comprising:
a housing; and
a holographic optical element (HOE) in said housing, said HOE having first and second faces and an optical axis;
said housing having a bore therein, said bore including first and second guide means therein, said first and second guide means being adapted to guide the ends of the first and second fibers, respectively, to said first face, perpendicular thereto, and equistant from said optical axis;
said HOE being adapted to couple optical energy from said first guide means to said second guide means and from said second guide means to said first guide means.

31. The optical fiber coupler of claim 30 wherein said HOE is flat.

32. The optical fiber coupler of claim 30 wherein said first and second guide means are adapted to guide the ends of the first and second fibers respectively, to contact said first face of said HOE.

33. The optical fiber coupler of claim 30 wherein said first and second guide means are further adapted to guide the ends of the first and second fibers to a predetermined distance from said first face of said HOE.

34. The optical fiber coupler of claim 30 further comprising an optical spacer in said housing, adjacent to said first face of said HOE; said first and second guide means being further adapted to guide the ends of said first and second fibers to contact said optical spacer.

35. The optical fiber coupler of claim 30 wherein said HOE is a wavelength-compensated HOE.

36. The optical fiber coupler according to claim 36, wherein said HOE is a transmissive HOE, said coupler further comprising a mirror in said housing, adjacent to said second face of said HOE, for reflecting optical energy emerging from said second face back into said HOE.

37. The optical fiber coupler of claim 30 wherein said HOE is a reflective HOE.

38. The optical fiber coupler of claim 30 wherein said HOE is a transmissive HOE; said coupler further comprising:
a plano-convex spherical component having a planar surface and a convex surface, said planar surface affixed to said second, surface of said HOE; and
a mirror affixed to said convex surface, for reflecting optical energy emerging from said HOE back into said HOE.

39. The optical fiber coupler of claim 30 wherein said first face is concave.

40. The optical fiber coupler of claim 30 in combination with first and second fibers, disposed in said first and second guide means, respectively.

41. An optical fiber coupler for coupling first and second optical fibers, comprising:
a housing; and
a holographic optical element (HOE) in said housing, said HOE having first and second faces and an optical axis, said first face being concave;
said housing having first and second guide means therein, said first and second guide means being adapted to guide the ends of the first and second fibers, respectively, to said first face, parallel to and equidistant from said optical axis;
said HOE being adapted to couple optical energy from said first guide means to said second guide means and from said second guide means to said first guide means.

42. The optical fiber coupler of claim 41 wherein said first and second guide means are further adapted to guide the ends of the first and second fibers to a predetermined distance from said first face of said HOE.

43. The optical fiber coupler of claim 41 wherein said HOE is a wavelength-compensated HOE.

44. The optical fiber coupler according to claim 41, wherein said HOE is a transmissive HOE, said coupler further comprising a mirror in said housing, mounted on said second face of said HOE, for reflecting optical energy emerging from said second face back into said HOE.

45. The optical fiber coupler of claim 41 wherein said HOE is a reflective HOE.

46. The optical fiber coupler of claim 41 wherein said first and second guide means are parallel to one another.

47. The optical fiber coupler of claim 41 wherein said first and second guide means converge towards said HOE.

48. The optical fiber coupler of claim 41 wherein said first and second guide means diverge towards said HOE.

49. The optical fiber coupler of claim 41 wherein said housing includes a bore, extending to said first face, and wherein said first and second guide means are disposed in said bore.

50. The optical fiber coupler of claim 41 wherein said optical fiber coupler further couples third and fourth optical fibers; said housing further comprising third and fourth guide means therein, said third and fourth guide means being adapted to guide the ends of the third and fourth fibers respectively, to said first face, parallel to and equidistant from said optical axis; said HOE being adapted to couple optical energy from said third guide means to said, fourth guide means and from said fourth guide means to said third guide means.

51. The optical fiber coupler of claim 41 in combination with first and second fibers, disposed in said first and second guide means, respectively.

52. The optical fiber coupler of claim 50 in combination with first, second, third, and fourth fibers disposed in said first, second, third and fourth guide means, respectively.

* * * * *

UNITED STATES PATENT OFFICE
CERTIFICATE OF CORRECTION

Patent No. 5,011,255      Dated April 30, 1991

Inventor(s) Terry P. Bowen and John R. Rowlette

It is certified that error appears in the above-identified patent and that said Letters Patent is hereby corrected as shown below:

In column 7, claim 5, line 25, the word "topical" should be --optical--.

In column 7, claim 7, line 50, the word "coverage" should be --converge--.

Signed and Sealed this

Eighteenth Day of August, 1992

Attest:

DOUGLAS B. COMER

*Attesting Officer*      Acting Commissioner of Patents and Trademarks